United States Patent
Reznikov et al.

(10) Patent No.: US 6,433,850 B2
(45) Date of Patent: *Aug. 13, 2002

(54) PRETILT ANGLE DIRECTION IN A LIQUID CRYSTAL CELL

(75) Inventors: Yuriy Reznikov; Oleq Yaroshchuk, both of Kyyiv (UA); Joung Won Woo, Seoul (KR); Yoo Jin Choi, Kyungki-Do (KR); Ki Hyuk Yoon, Seoul (KR); Mi Sook Nam, Kyungki-Do (KR); Jong Hyun Kim; Soon Bum Kwon, both of Seoul (KR)

(73) Assignee: LG. Phillips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/760,889

(22) Filed: Jan. 17, 2001

Related U.S. Application Data

(62) Division of application No. 09/457,388, filed on Dec. 9, 1999, which is a continuation of application No. 08/672,183, filed on Jun. 27, 1996.

(30) Foreign Application Priority Data

Jan. 9, 1996 (KR) .............................. 96-00319

(51) Int. Cl.[7] .............................. G02F 1/1337
(52) U.S. Cl. ....................... 349/124; 349/129
(58) Field of Search .................. 349/123, 124, 349/129, 132, 133

(56) References Cited

U.S. PATENT DOCUMENTS

| | | |
|---|---|---|
| 3,912,920 A | 10/1975 | Kubota |
| 4,963,448 A | 10/1990 | Ichimura et al. |
| 4,974,941 A | 12/1990 | Gibbons et al. |
| 5,032,009 A | 7/1991 | Gibbons et al. |
| 5,073,294 A | 12/1991 | Shannon et al. |
| 5,296,321 A | 3/1994 | Kawanishi et al. |
| 5,389,698 A | 2/1995 | Chigrinov et al. |
| 5,447,662 A | 9/1995 | Herr et al. |
| 5,453,862 A | 9/1995 | Toko et al. |
| 5,464,669 A | 11/1995 | Kang et al. |
| 5,479,282 A | 12/1995 | Toko et al. |

(List continued on next page.)

FOREIGN PATENT DOCUMENTS

| | | |
|---|---|---|
| DE | 4420585 | 12/1995 |
| DE | 197 03 682 | 8/1997 |
| EP | 0 261 712 | 3/1988 |

(List continued on next page.)

OTHER PUBLICATIONS

W. Gibbons et al., Surface–mediated alignment of nematic liquid crystals with polarized laser light, Letters to Nature, vol. 351, May 2, 1991, pp. 49–50.

Martin Schadt, Surface–Induced Parallel Alignment of Liquid Crystals by Linearly Polymerized Photopolymers, Jpn. J. Appl. Phys., vol. 31 (1992), Part 1, No. 7, Jul. 1992.

Yasufumi Iimura et al., Alignment Control of a Liquid Crystal on a Photosensitive Polyvinylalcohol Film, Jpn. J. Appln. Phys., vol. 32 (1993), Part 2, No. 1A/B, Jan. 15, 1993.

(List continued on next page.)

Primary Examiner—Toan Ton
(74) Attorney, Agent, or Firm—Long Aldridge & Norman LLP

(57) ABSTRACT

A method is disclosed for controlling a pretilt angle direction for a liquid crystal cell comprising the steps of first setting the magnitude of pretilt angle and a plurality of pretilt angle directions in an alignment layer. This first step is achieved by irradiating linearly the alignment layer with polarized or unpolarized UV light. One of the plurality of pretilt angle directions is then selected by exposing the alignment layer to UV light a second time.

11 Claims, 7 Drawing Sheets

U.S. PATENT DOCUMENTS

| | | | |
|---|---|---|---|
| 5,538,823 A | 7/1996 | Park et al. |
| 5,539,074 A | 7/1996 | Herr et al. |
| 5,576,862 A | 11/1996 | Sugiyama et al. |
| 5,578,351 A | 11/1996 | Shashidhar et al. |
| 5,602,661 A | 2/1997 | Schadt et al. |
| 5,604,615 A | 2/1997 | Iwagoe et al. |
| 5,657,105 A | 8/1997 | McCartney |
| 5,705,096 A | 1/1998 | Kano et al. |
| 5,712,696 A | 1/1998 | Toko et al. |
| 5,764,326 A | 6/1998 | Hasegawa et al. |
| 5,767,994 A | 6/1998 | Kang et al. |
| 5,784,139 A | 7/1998 | Chigrinov et al. |
| 5,786,041 A | 7/1998 | Takenaka et al. |
| 5,824,377 A | 10/1998 | Pirwitz et al. |
| 5,853,818 A | 12/1998 | Kwon et al. |
| 5,856,430 A | 1/1999 | Gibbons et al. |
| 5,856,431 A | 1/1999 | Gibbons et al. |
| 5,859,682 A | 1/1999 | Kim et al. |
| 5,880,803 A | 3/1999 | Tamai et al. |
| 5,882,238 A | 3/1999 | Kim et al. |
| 5,889,571 A | 3/1999 | Kim et al. |
| 5,909,265 A | 6/1999 | Kim et al. |
| 5,928,561 A | 7/1999 | Bryan-Brown et al. |
| 5,982,466 A | 11/1999 | Choi et al. |

FOREIGN PATENT DOCUMENTS

| | | |
|---|---|---|
| EP | 0 525 473 | 2/1993 |
| EP | 0 525 478 | 2/1993 |
| EP | 0 549 283 | 6/1993 |
| EP | 0 635 748 | 1/1995 |
| EP | 0 708 354 | 4/1996 |
| EP | 0 611 786 | 7/1996 |
| EP | 0 742 471 | 11/1996 |
| EP | 0 788 012 | 8/1997 |
| GB | 2 281 977 | 3/1995 |
| GB | 2 286 893 | 8/1995 |
| GB | 2 309 793 | 8/1997 |
| GB | 2 309 794 | 8/1997 |
| GB | 2 310 048 | 8/1997 |
| GB | 2 317 964 | 4/1998 |
| GB | 2 319 093 | 5/1998 |
| JP | 55885 | 1/1983 |
| JP | 64-60833 | 3/1989 |
| JP | 1-251344 | 10/1989 |
| JP | 1-251345 | 10/1989 |
| JP | 02-55330 | 2/1990 |
| JP | 02-298917 | 12/1990 |
| JP | 03-36527 | 2/1991 |
| JP | 03-120503 | 5/1991 |
| JP | 03-241311 | 10/1991 |
| JP | 03-259115 | 11/1991 |
| JP | 04-007520 | 1/1992 |
| JP | 04-284421 | 10/1992 |
| JP | 04-350822 | 12/1992 |
| JP | 05-019208 | 1/1993 |
| JP | 05-34699 | 2/1993 |
| JP | 05-53513 | 3/1993 |
| JP | 05-232473 | 9/1993 |
| JP | 07-56173 | 3/1995 |
| JP | 07-261185 | 10/1995 |
| JP | 07-318861 | 12/1995 |
| JP | 07-318942 | 12/1995 |
| JP | 08-334790 | 12/1996 |
| JP | 09-211465 | 8/1997 |
| JP | 09/211468 | 8/1997 |
| JP | 09-265095 | 10/1997 |
| JP | 09-318946 | 12/1997 |
| JP | 10-090684 | 4/1998 |
| JP | 10-154658 | 6/1998 |
| JP | 10-161126 | 6/1998 |
| JP | 10-332932 | 12/1998 |
| JP | 11-194344 | 7/1999 |
| JP | 11-194345 | 7/1999 |
| WO | 94/28458 | 12/1994 |
| WO | 95/18989 | 7/1995 |
| WO | 95/22075 | 8/1995 |
| WO | 95/34843 | 12/1995 |
| WO | 96/22561 | 7/1996 |
| WO | 99/08148 | 2/1999 |

OTHER PUBLICATIONS

Hashimoto et al., TN–LCD with Quartered Subpixels Using Polarized UV–Light–Irradiated Polymer Orientation Films, SID 95 Digest, pp. 877–880, (1995).

Kunihiro Ichimura, Photocontrol of Liquid Crystal Alignment, 1993.

T. Marushii et al., Photosensitive Orientants for Liquid Crystal Alignment, Mol. Mat. 1993, vol. 3, pp. 161–168.

Y. Toko et al., TN–LCDs Fabricated by Non–Rubbing Showing Wide and Homogeneous Viewing Angular Characteristics and Excellent Voltage Holding Ratio, SID 93 Digest, pp. 622–625.

P. Shannon et al., Patterned optical properties in photopolymerized surface–aligned liquid–crystal films, Letters to Nature, vol. 368, Apr. 7, 1994, pp. 532–533.

Y. Iimura et al., Invited Address: Electro–Optic Characteristics of Amorphous and Super–Multidomain TN–LCDs Prepared by a Non–Rubbing Method, SID 94 Digest, pp. 915–918.

M. Schadt et al., Photo–Generation of Linearly Polymerized Liquid Crystal Aligning Layers Comprising Novel, Integrated Optically Patterned Retarders and Color Filters, Jpn. J. Appl. Phys., vol. 34 (1995), pp. 3240–3249, Part 1, No. 6A, Jun. 1995.

A. Lien et al., UV modification of surface pretilt of alignment layers of multidomain liquid crystal displays, Appl. Phys. Lett. 62(21), Nov. 20, 1995, pp. 3108–3111.

M. Hasegawa, Nematic Homogeneous Photo Alignment by Polymide Exposure to Linearly Polarized UV, Journal of Photopolymer Science and Technology, vol. 8, No. 2, 1995, pp. 241–248.

M. Schadt, Investigation of the Mechanism of the Surface–Induced Alignment of Liquid Crystals by Linearly Polymerized Photopolymers, SID 95 Digest, pp. 528–531.

J. Chen, "Model of liquid crystal alignment by exposure to linearly polarized ultraviolet light," Physical Review E, vol. 54, No. 2, Aug., 1996, pp. 1599–1603.

H. Soh et al., "The Realization of Wide Viewing Angle TFT–LCDs using Photo–Alignment Method," Euro Display 96, pp. 579–582.

J. Chen, "Mechanism of Liquid–Crystal Alignment by Polyimide Exposure to Linearly Polarized UV Light," SID 96 Digest, pp. 634–637.

K. Lee et al., "Late–News Poster: Mechanism of UV Modification of LC Pretilt Angle and Its Application to Two–Domain TN–LCDs," SID 96 Digest, pp. 638–641.

J. Kim et al., "Late–News Poster: Photo–Alignment of Liquid Crystals Using a New Photopolymer," SID 96 Digest, pp. 646–649.

Y. Saitoh et al., "Stability of UV–Type Two–Domain Wide–Viewing–Angle TFT–LCD Panels," SID 96 Digest, pp. 662–665.

D. Seo et al., "Invited Address: Surface Alignemnt of Liquid Crystals in LCDs," SID 93 Digest, pp. 954–956.

Y. Iimura, "Invited Paper: Prospects of the Photo–alignment Technique for LCD fabrication," SID 97 Digest, pp. 311–314.

R. Shashidhar et al., "A New Non–Rubbing Technique for Liquid–Crystal Alignment," SID 97 Digest, pp. 315–318.

M. Schadt et al., "Invited Paper: Optical Patterning of Multidomain LCDs," SID 97 Digest, pp. 397–400.

K. Han et al., "A Study on the Photo–Alignment of the Polymer–Containing Cinnamate Group Using a New Single UV–Exposure Method," SID 97 Digest, pp. 707–710.

F. Yamada et al., "Late–News Poster: A New Photo–Alignment Scheme for LC–Cell Pretilt Control," SID 97 Digest, pp. 715–718.

M. Nam et al., "Wide–Viewing–Angle TFT–LCD with Photo–Aligned Four–Domain TN Mode," SID 97 Digest, pp. 933–936.

Lim et al., "Tilting of Liquid Crystal through Interaction with Methyl Orange Molecules Oriented by Circularly Polarized Light," JP Journal of Applied Physics, vol. 35, Oct. 1996, pp. 1281–1283.

Eugene Hecht, "*Optics,*" 1987, pp. 298–299.

Jenkins et al., "Fundamentals of Optics," McGraw Hill Book Company, Third Edition, 1957, pp. 492–493.

PRETILT ANGLE DIRECTION IN A LIQUID CRYSTAL CELL

This application is a Division of U.S. patent application Ser. No. 09/457,388, filed Dec. 9, 1999, which is a Continuation patent application of Ser. No. 08/672,183, filed Jun. 27, 1996.

BACKGROUND OF THE INVENTION

The present invention relates to a liquid crystal cell, and particularly to a method for controlling a pretilt angle direction in liquid crystal cell in which photoreaction occur in a polymerized layer by ultraviolet irradiation.

Liquid crystals are the liquids consisting of anisotropic molecules. The average direction of long axes of these molecules is referred as the director of LC. The director distribution in a LC bulk is determined by its anchoring on the rigid substrates and characterized by the direction of the axes of easy orientation, corresponding to the minimum of the surface energy of an LC, pretilt angle between the axis of easy orientation and the substrate plane, and tilt angle between the director of LC and the substrate plane.

In order to obtain the uniform brightness and high contrast ratio of a liquid crystal display, the LC molecules must be appropriately aligned after being injected between the substrates of the cell. Not only the value of the director tilt but the direction of this tilt (i.e. direction of the axis of easy orientation) is important for normal operation of LC devices constituting double- and multi-domain structure. Such alignment is achieved by providing an alignment layer on the surface of the substrate. A rubbing process can be used for aligning liquid crystal molecules. In this rubbing process, a polyamide alignment layer is first coated on the substrate and the rubbing is performed mechanically, so that microgrooves are formed on the surface of the alignment layer. The liquid crystal molecules are thus uniformly aligned due to the intermolecular interaction between the polyamide molecules and the liquid crystal molecules.

In the above described rubbing process, however, defects are formed in the microgrooves which cause light scattering and random phase distortion. Also during the rubbing process, dust and electrostatic charges are produced in the alignment layer, so that the substrate is damaged and yield is decreased.

To solve the aforementioned problem, photo-alignment process has been recently introduced. As an example of the photo-alignment method, a method has proposed by KOBAYASHI, etc. (SID 95 DIGEST, p. 877) in which the pretilt angle direction is determined by irradiating the UV light twice into an alignment layer consisting of polyvinyl-cinnamate (PVCN) based polymer, as shown in FIGS. 1A and 1B.

In particular, as shown in FIG. 1A, when the linearly polarized UV light irradiates to alignment layer 15 in the direction perpendicular to the surface of the substrate 16, the alignment layer 15 becomes a photo-polymerized due to cross linking between polymer molecules. The bonding direction of the photo-polymer molecules depends on the polarization direction of the linearly polarized UV light. The liquid crystal is thus aligned according to the bonding direction of the photo-polymer molecules.

Then, the linearly polarized UV light whose polarization direction is perpendicular to the polarization direction of the first UV light is irradiated at an angle φ to the alignment layer 15. The pretilt angle of the alignment layer 15 is formed in this step and the magnitude of the pretilt angle varies according to the irradiation angle of the UV light. For example, the pretilt angles are approximately 0.15°, 0.26°, or 0.30°, when the irradiation angles are 30°, 40°, or 60°, respectively.

In KOBAYASHI, however, the method has some drawbacks the thermostability of the tilt angle on the PVCN based materials is poor, the scope of the pretilt angle is small and does not cover the range needed for an applications, only polarized exciting light could be used. Moreover, the method requires rather complicated geometry of the irradiation and suitable for the only materials revealing the light-induced easy axis direction perpendicular to the polarization of the exciting light.

SUMMARY OF THE INVENTION

It is an object of the present invention to provide a method for controlling pretilt angle direction for liquid crystal cell in which control of the pretilt angle direction is easy and large pretilt angle can be obtained.

In order to achieve the object, the method for controlling pretilt angle for liquid crystal cell comprises the first step of irradiating UV light to an alignment layer to form pretilt angle and orient the alignment axis and second step of irradiating UV light to the alignment layer in the direction of oblique to the surface. The order of these step is reversible.

The first and second exposures to UV light can be performed at an angle, preferably 0–60°, or perpendicular to the substrate surface. Moreover, both polarized and unpolarized UV light can be used.

DETAILED DESCRIPTION OF THE INVENTION

Figure 1A:
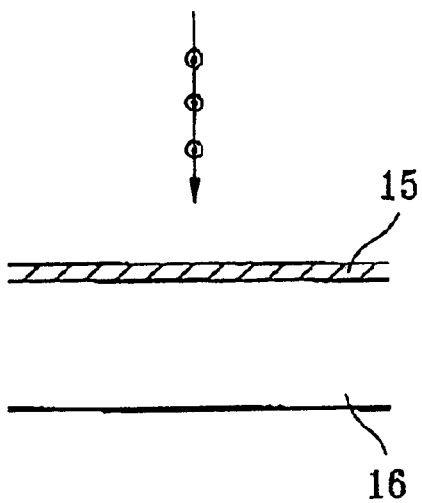
FIGS. 1A and 1B are views illustrating the conventional method for controlling pretilt angle for liquid crystal cell.
Figure 1B:
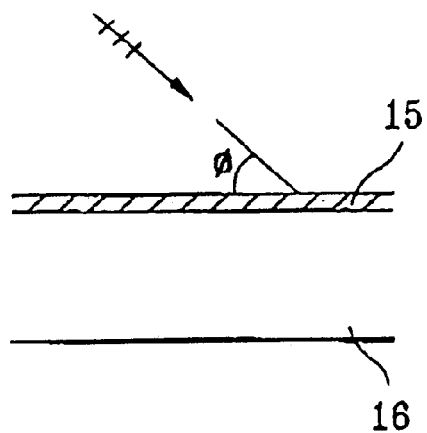
Figure 2:
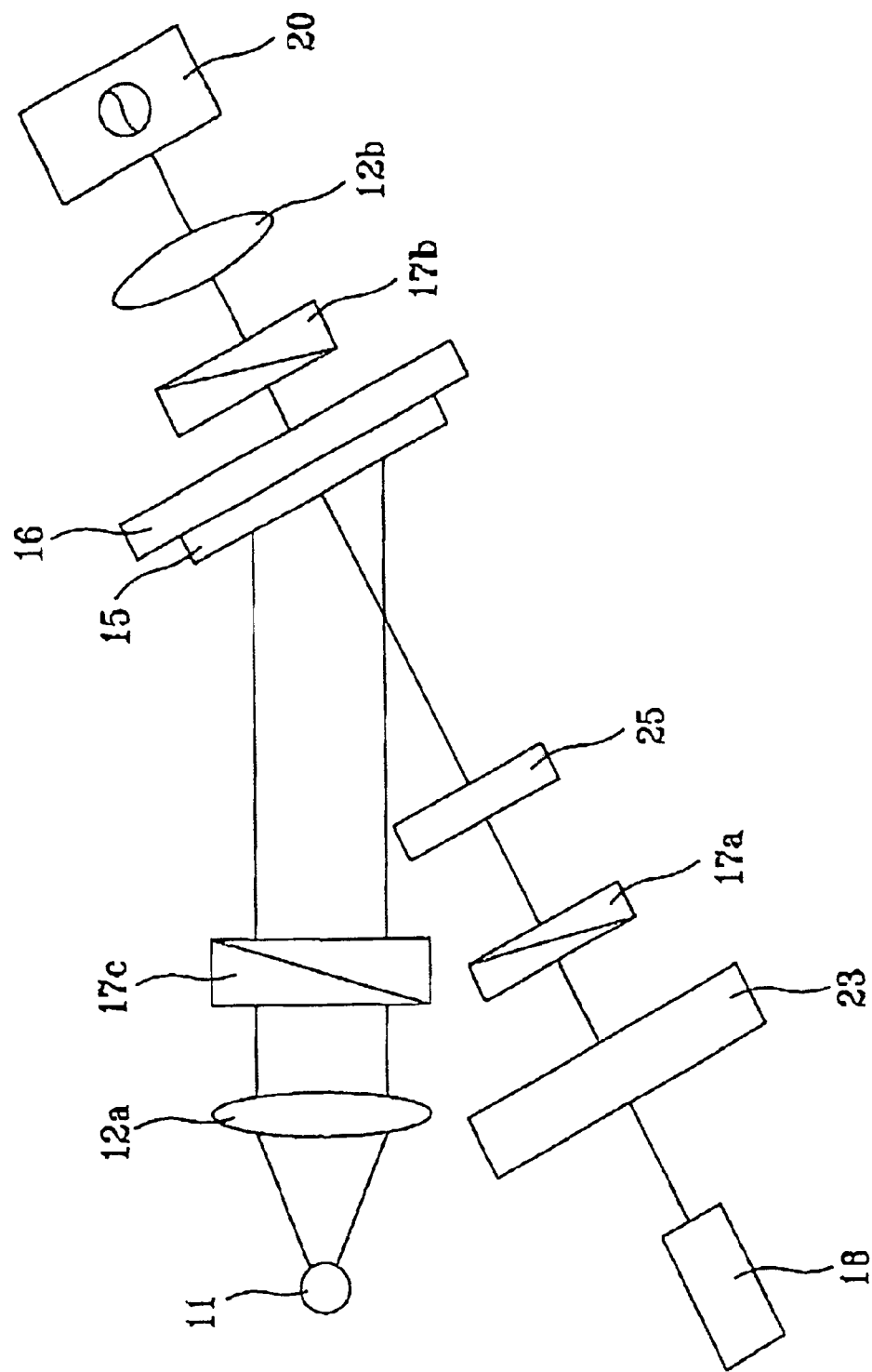
FIG. 2 is a view illustrating an UV light irradiation and birefringence measurement apparatus.

FIG. 2 is a view illustrating ultraviolet (UV) irradiating and birefringence measuring apparatus for photo-alignment process. In this device, UV light generated from Hg lamp 11 is linearly polarized through a lens 12a and a polarizer 17c, and is directed to the alignment layer 15 coated on substrate 16. A laser beam generated from a laser 18 is pulsed by beam by a chopped 23, and then it is polarized by a polarized 17a. The pulsed beam is then transmitted to the alignment layer 15 through a compensator 25, through a polarizer 17b and a lens 12b, and finally inputted to a digital oscilloscope 20 so that the birefringence caused by anisotropy of the alignment layer 15 can be measured.

Figure 3A:
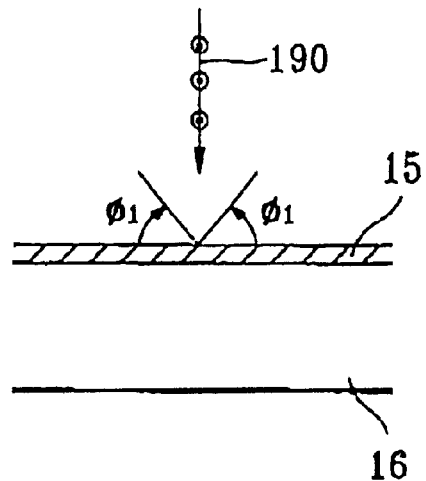
FIGS. 3A and 3B are views illustrating method for controlling pretilt angle direction for liquid crystal cell according to first embodiment of the present invention.
Figure 3B:
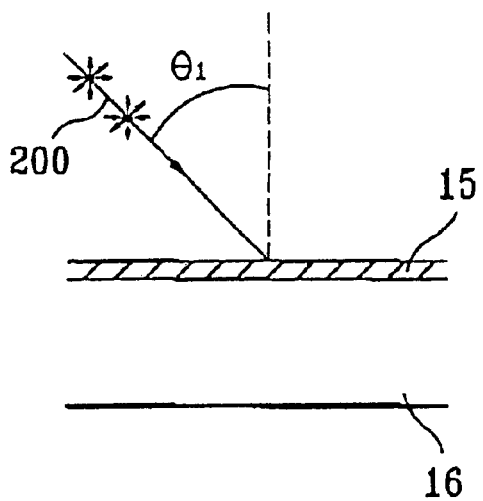

FIGS. 3A and 3B illustrate first embodiment of the present invention. In this embodiment, the alignment layer includes polysiloxane based material or polyvinylfluorocinnamate (PVCN-F). In this alignment layer, pretilt angle and the direction of the easy axis are determined by one time irradiation of the UV light. The structural formulas of the polysiloxanecinnamate and PVCN-F are indicated below. Further, these materials can be used in other embodiments of the present invention.

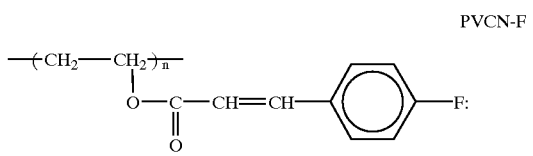

PVCN-F examples of polysiloxanecinnamate include:

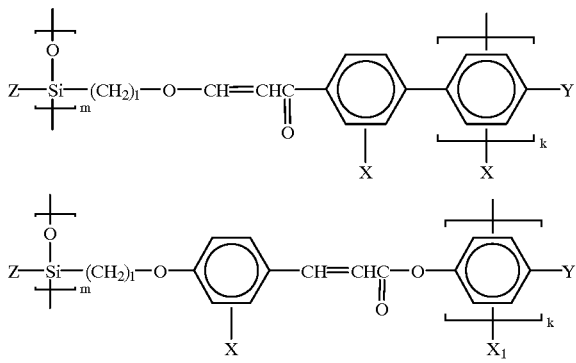

Z=OH, CH$_3$ or a mixture of OH and CH$_3$
m=10–100
l=1,3,4,5,6,7,8,9 or 10
K=0,1 or 2
X,X$_1$,Y=H,F,Cl,CN,CF$_3$,OCF$_3$,C$_n$H$_{2n+1}$ or OC$_n$H$_{2n+1}$ (n=1–10)

The polymer solution, the polysiloxanecinnamate or PVCN-F solution, is prepared using 1:1 mixture of 1,2-dichloroetane and chlorobenzene. A concentration of the solution is 20 g/l. A droplet of this solution is dropped in the center of the substrate and then coated on the whole area of the substrate by a spin-coating for 20 second at 2,000 rpm. As a result, a polymer film is deposited on the substrate. The thickness of the film, measured by Linnik interferometer, is 1,000 Å, and can be controlled by changing the concentration of the polymer solution and/or revolution speed of a spin-coating machine used for spin-coating.

As shown in FIG. 3A, when the linearly polarized UV light 190 is irradiated to the alignment layer 15 in the perpendicular direction of the surface of the substrate, the direction of alignment-axis is determined to be perpendicular to the polarization direction of the UV light. Further, two symmetric and bidirectional pretilt angles $\phi_1$ are created on both sides of the alignment-axis. The size of the pretilt angle $\phi_1$ is variable and depends on the duration of UV exposure, i.e., the amount of UV energy absorbed by alignment layer 15.

Figure 4:
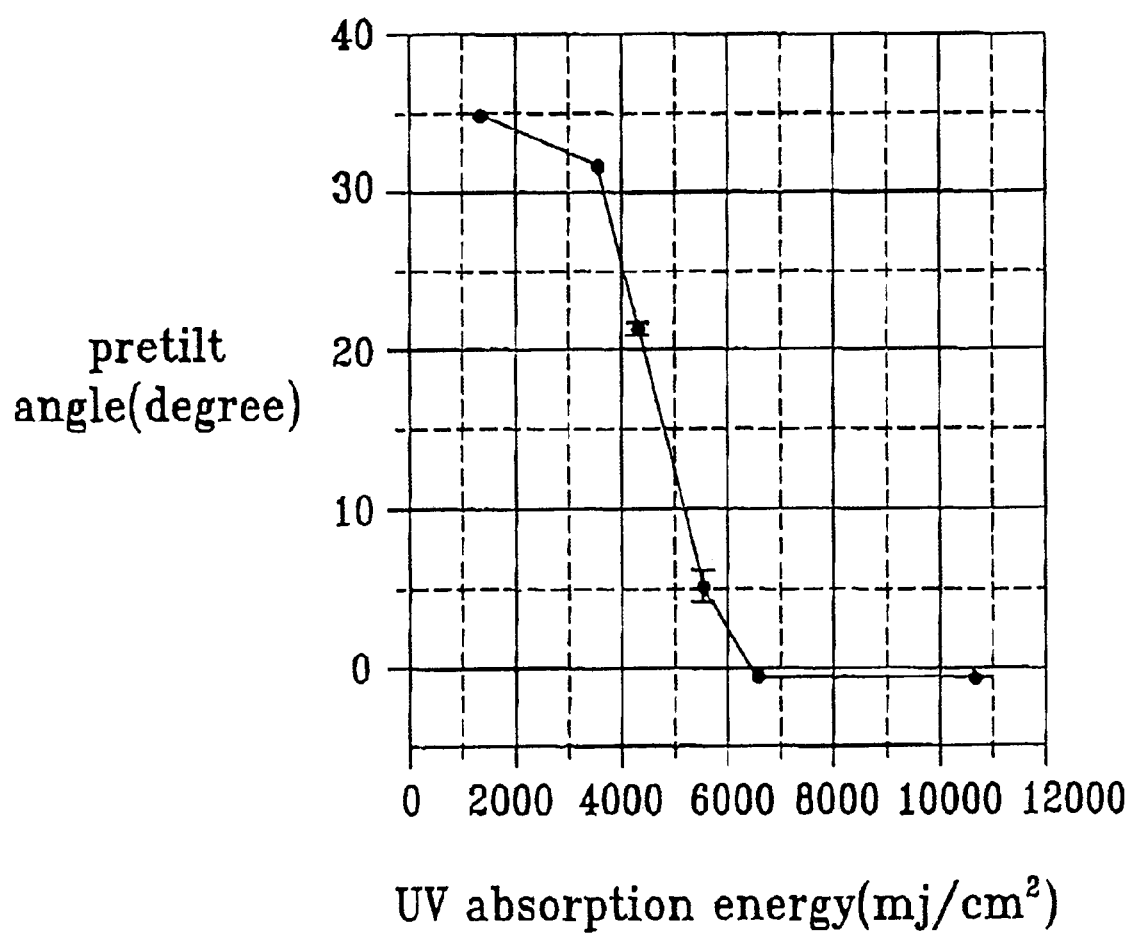
FIG. 4 is a graph showing pretilt angle dependent on a absorption energy of the UV light.

FIG. 4 is a graph showing the relation between the pretilt angle and the irradiation time of the UV light, i.e., the amount of absorption energy of the UV light. As shown in the figure, the larger the absorption energy is, the smaller the pretilt angle becomes. Accordingly, the direction of the alignment axis is determined by the polarization direction of the UV light irradiation, and the size of pretilt angle is dependent upon the amount of UV absorption energy.

After irradiating linearly polarized UV light, another light is irradiated to the layer to the direction oblique to the surface of the alignment layer, that is, one direction of two symmetric pretilt angles is then selected by irradiating alignment layer 15 at an angle $\theta_1$, 0°<$\theta_1$≦60° with non-linearly polarized UV light, specially unpolarized UV light 200, such that all the molecules of alignment layer 15 are oriented at one of the symmetric pretilt angle directions, as in FIG. 3B. The alignment layer 15 preferably includes polysiloxane based material or PVCN-F. In this case, the irradiation direction of the second UV light forms acute angle with one of two symmetric pretilt angle directions.

Figure 5A:
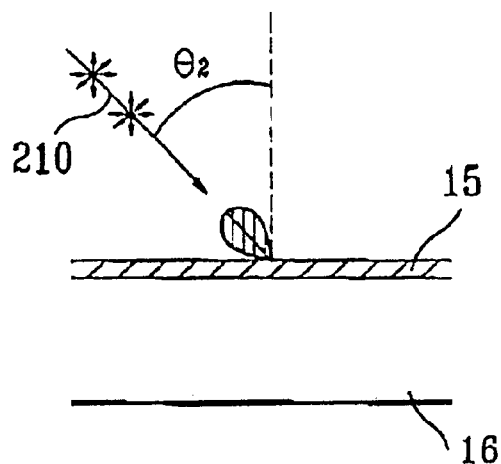
FIGS. 5A and 5B are views illustrating the method for controlling pretilt angle direction for liquid crystal cell according to second embodiment of the present invention.
Figure 5B:
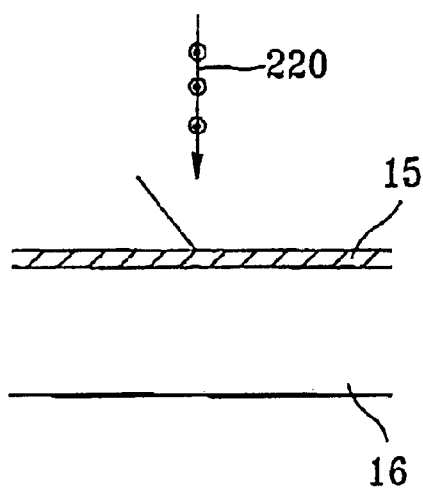

FIGS. 5A and 5B illustrate a second embodiment of the present invention. In the figure, unpolarized UV light (wavelength λ=365 nm) 210 irradiates alignment layer 15 coated on the substrate 16 at an angle $\theta_2$ to the normal direction of the surface of the substrate 16. Although unpolarized UV light is used in this embodiment, the non-linearly polarized UV light, which means that the light is circularly or elliptically polarized, or the light does not polarized can be used either. $\theta_2$ is preferably in the range of 0°<$\theta_2$≦60°. After the initial irradiation shown in FIG. 5A, the molecules of alignment layer 15 are set or oriented with a large number of one sided pretilt angle directions, while the magnitude of the pretilt angles formed by each of these directions with the surface is substantially the same. After the second irradiation shown in FIG. 5B, however, only one of the pretilt angle directions will be selected.

Thereafter, when linearly polarized UV light 220 irradiates the alignment layer 15 at a perpendicular angle, as shown in FIG. 5B, only the pretilt angle direction perpendicular to the polarization direction of this UV light is selected, so that the desired pretilt angle direction can be obtained. Furthermore, the size or magnitude of the pretilt angle produced in the alignment layer 15 varies depending upon the amount of UV energy absorbed, as noted above with respect to FIG. 4.

Figure 6A:
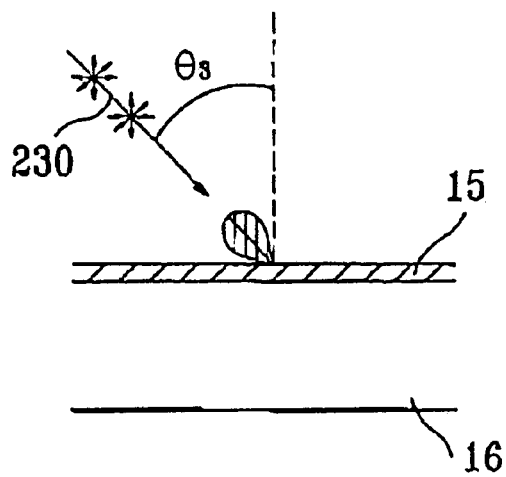
FIGS. 6A and 6B are views showing the method for controlling pretilt angle direction according to third embodiment of the present invention.
Figure 6B:
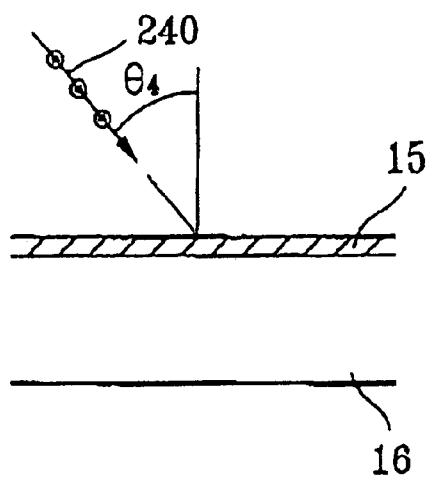

FIGS. 6A and 6B illustrate a third embodiment of the present invention. As shown in FIG. 6A, unpolarized UV light 230 irradiates alignment layer 15 at an angle $\theta_3$ to the normal direction of the surface of the substrate, where the $\theta_3$ is in the range of 0°<$\theta_3$≦60°. Thereafter, linearly polarized UV light 240 irradiates alignment layer 15 again at an angle $\theta_4$, as shown in FIG. 6B, where the $\theta_4$ is in the range of 0°<$\theta_4$≦60°.

The resulting orientations of the molecules of alignment layer 15 after the steps shown in FIGS. 6A and 6B is similar to that of FIGS. 5A and 5B, respectively. Namely, after the irradiation shown in FIG. 6A, the molecules of the alignment layer 15 are oriented at a large number of one sided pretilt angle directions, as in FIG. 5A. Moreover, as in FIG. 5B, only one of these directions is selected after the second irradiation shown in FIG. 5B. The irradiation direction of the second UV light forms acute angle with the pretilt angle directions by first irradiation. In this embodiment, non-linearly polarized UV light, including circularly polarized, elliptically polarized, and unpolarized UV light, can be used instead of unpolarized UV light. By using non-linearly polarized UV light, the method becomes simplified compared with the conventional method using linearly polarized UV light.

Figure 7A:
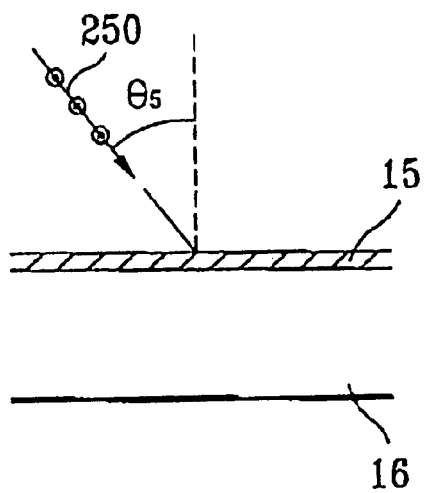
FIGS. 7A and 7B are views showing the method for controlling pretilt angle direction according to fourth embodiment of the present invention.
Figure 7B:
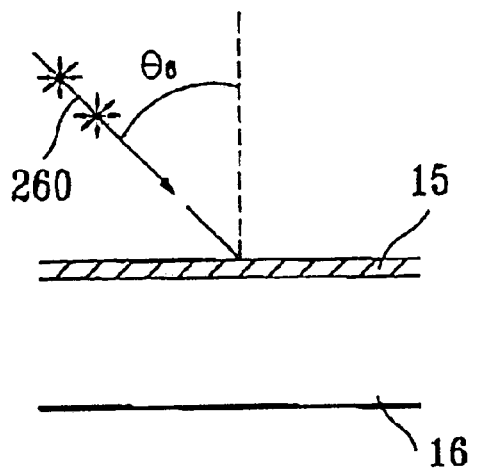

A fourth embodiment of the present invention is shown in FIGS. 7A and 7B. As shown in FIG. 7A, linearly polarized light 250 irradiates alignment layer 15 at an angle $\theta_5$, 0°<$\theta_5$≦60°, relative to the normal of the surfaces of alignment layer 15 to orient the molecules of alignment layer 15 at first and second pretilt angle directions, similar to that shown in FIG. 3A. One of these directions is then selected by irradiating alignment layer 15 at an angle $\theta_6$, $0°<\theta_5\leq60°$, with non-linearly polarized UV light, specially unpolarized UV light 260, such that all the molecules of alignment layer 15 are oriented at one of the first and second pretilt angle directions, as in FIG. 7B. In this embodiment, the irradiation direction of the second UV light forms acute angle with one of the first and second pretilt angle directions.

In aforementioned methods according to the present invention, the size of the pretilt angle and the two symmetric pretilt angle directions are determined by an initial exposing an alignment layer including a polysiloxane based material or PVCN-F to UV light. One of these pretilt angles is then selected by a second exposure to UV light. Accordingly, the pretilt angle can be controlled easily.

While the invention has been described in its preferred embodiments, this should not be construed as limitation on the scope of the present invention. Accordingly, the scope of the present invention should be determined not by the embodiment illustrated, but by the appended claims and their legal equivalents.

What is claimed is:

1. A method for controlling a pretilt angle direction for an alignment layer of a liquid crystal cell, comprising the steps of:

irradiating said alignment layer on a substrate surface a first time with linearly polarized ultraviolet light to orient molecules of said alignment layer in first and second pretilt angle directions, said first and second pretilt angle directions forming first and second pretilt angles, respectively, relative to a direction parallel to said substrate surface; and irradiating said alignment layer a second time with non-linearly polarized ultraviolet light to select one direction of said first and second pretilt angle directions.

2. A method for controlling a pretilt angle direction for an alignment layer of a liquid crystal cell according to claim 1, wherein a magnitude of said first and second pretilt angles are determined by a duration of said irradiation step first time.

3. A method for controlling a pretilt angle direction for an alignment layer of a liquid crystal cell according to claim 1, wherein said first and second pretilt angles are of equal magnitude substantially and of opposite sign relative to said parallel direction to said substrate surface.

4. A method for controlling a pretilt angle direction for an alignment layer of a liquid crystal cell according to claim 1, wherein said alignment layer includes a polysiloxane based material.

5. A method for controlling a pretilt angle direction for an alignment layer of a liquid crystal cell according to claim 1, wherein said alignment layer includes polyvinylfluorocinnamate(PVCN-F).

6. A method for controlling a pretilt angle direction for an alignment layer of a liquid crystal cell according to claim 1, wherein said step of irradiating said alignment layer a first time include a step of irradiating said alignment layer to ultraviolet light at an angle substantially equal to ninety degree relative to said substrate surface, and said step of irradiating said alignment layer a second time includes a step of irradiating said alignment layer at an angle relative to a normal direction to said substrate surface.

7. A method for controlling a pretilt angle direction for an alignment layer of a liquid crystal cell according to claim 6, wherein a incident direction of said second non-linearly polarized ultraviolet light forms an acute angle with said one of said first and second pretilt angle directions.

8. A method for controlling a pretilt angle direction for an alignment layer of a liquid crystal cell according to claim 6, wherein said angle is in the range of 0 degree to 60 degree.

9. A method for controlling a pretilt angle direction for an alignment layer of a liquid crystal cell according to claim 1, wherein said step of irradiating said alignment layer a first time include a step of irradiating said alignment layer to ultraviolet light at a first angle relative to a normal direction to said substrate surface, and said step of irradiating said alignment layer a second time includes a step of irradiating said alignment layer at a second angle relative to a normal direction to said substrate surface.

10. A method for controlling a pretilt angle direction for an alignment layer of a liquid crystal cell according to claim 9, wherein a incident direction of said second non-linearly polarized ultraviolet light forms an acute angle with said one of said first and second pretilt angle directions.

11. A method for controlling a pretilt angle direction for an alignment layer of a liquid crystal cell according to claim 9, wherein said first and second angles are in the range of 0 degree to 60 degree, respectively, relative to a normal direction to said substrate surface.

* * * * *